United States Patent [19]
Cradeur et al.

[11] Patent Number: 5,403,145
[45] Date of Patent: Apr. 4, 1995

[54] STREET LEGAL, MOBILE, TRUCK MOUNTED TUBE BUNDLE PULLING APPARATUS

[75] Inventors: Robert R. Cradeur, Sulpher, La.; Richard W. Krajicek, Houston, Tex.

[73] Assignee: Serv-Tech, Inc., Houston, Tex.

[21] Appl. No.: 221,920

[22] Filed: Apr. 1, 1994

Related U.S. Application Data

[63] Continuation of Ser. No. 739,466, Aug. 2, 1991, abandoned.

[51] Int. Cl.$^6$ .............................................. B66F 11/00
[52] U.S. Cl. ............................... 414/745.3; 180/24.01; 414/541; 414/544; 414/547
[58] Field of Search ................ 414/495, 501, 540, 541, 414/542, 543, 544, 547, 555, 633, 745.3; 180/24.01

[56] References Cited

U.S. PATENT DOCUMENTS

| | | | |
|---|---|---|---|
| 2,857,062 | 10/1958 | Anderson | 414/543 |
| 3,064,834 | 11/1962 | Dempster et al. | |
| 3,121,499 | 2/1964 | LaBarre, Jr. | |
| 3,452,887 | 7/1969 | Larson et al. | |
| 3,501,031 | 3/1970 | Whitfield | 414/543 |
| 3,734,223 | 5/1973 | Anderson | |
| 3,937,340 | 2/1976 | Grove | |
| 4,306,832 | 12/1981 | Schmiesing | |
| 4,392,524 | 7/1983 | Bauch | |
| 4,575,305 | 3/1986 | Krajicek et al. | |
| 4,666,365 | 5/1987 | Cradeur | |
| 4,943,118 | 7/1990 | Davis | 298/12 |
| 4,943,203 | 7/1990 | Bohata | |
| 4,986,719 | 1/1991 | Galbreath | |
| 5,088,570 | 2/1992 | Loeber | 180/24.01 |
| 5,169,281 | 12/1992 | Boisture | 414/745.3 |
| 5,305,844 | 4/1994 | Ducote | 180/24.01 |

Primary Examiner—Michael S. Huppert
Assistant Examiner—Janice L. Krizek
Attorney, Agent, or Firm—John R. Kirk, Jr.

[57] ABSTRACT

The invention relates to a street legal mobile mounted tube bundle pulling apparatus which is moveable from a lifting position to a travelling position. A longitudinal track is attached to the bed of the vehicle. A sled which is contiguous with said track supports a turntable. A vertical telescoping column is mounted on the turntable. A bundle pulling apparatus is attached to the vertical telescoping column. Hydraulic cylinders are used for actuating both the turntable and the sled. By actuating the sled the telescoping column and bundle pulling apparatus which is a majority of the mass can be dragged to and between a rearward lifting position and a forward travelling position.

6 Claims, 8 Drawing Sheets

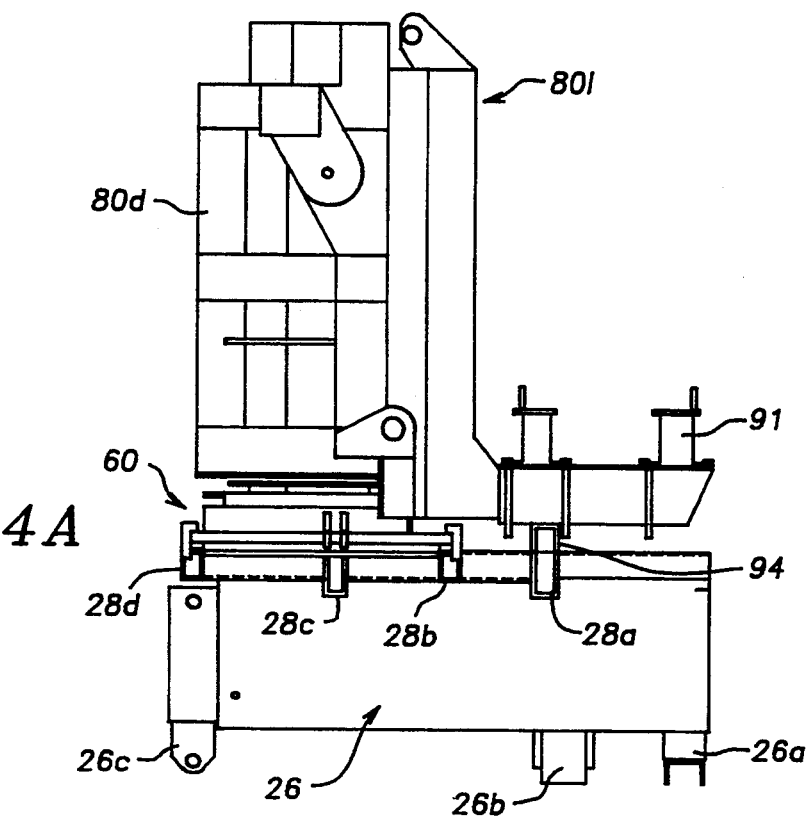
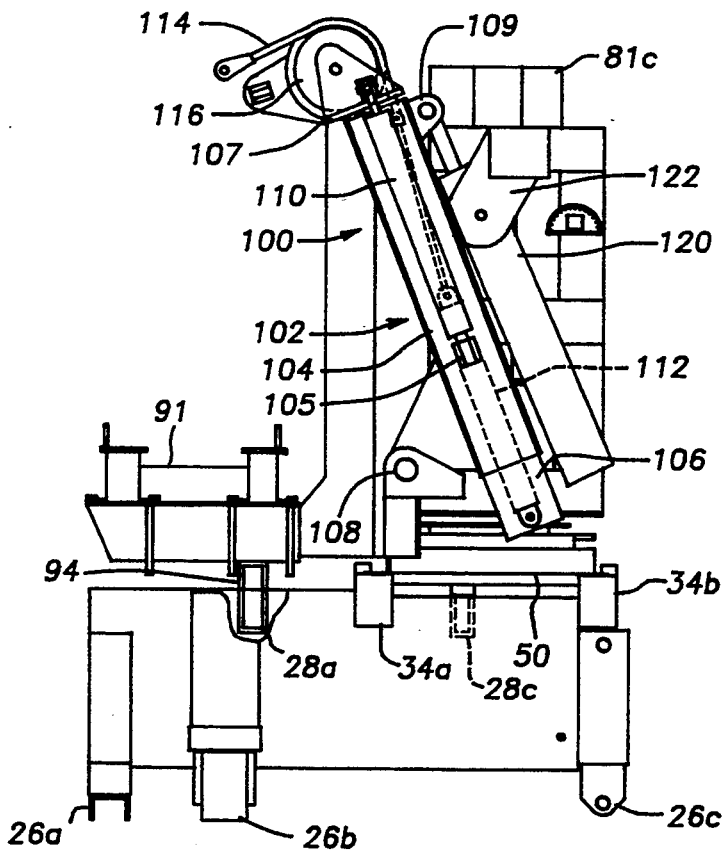

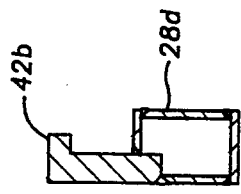
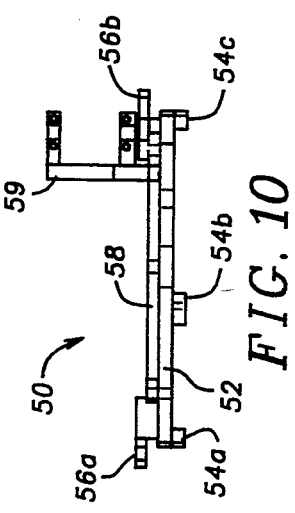
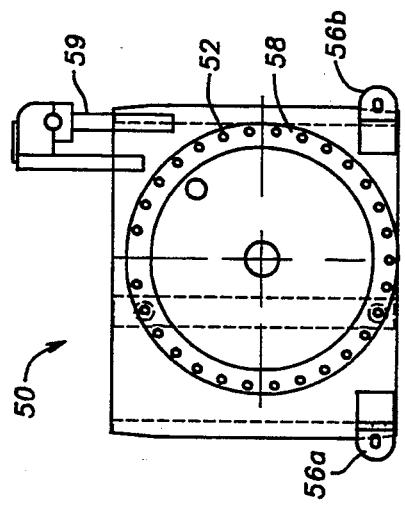
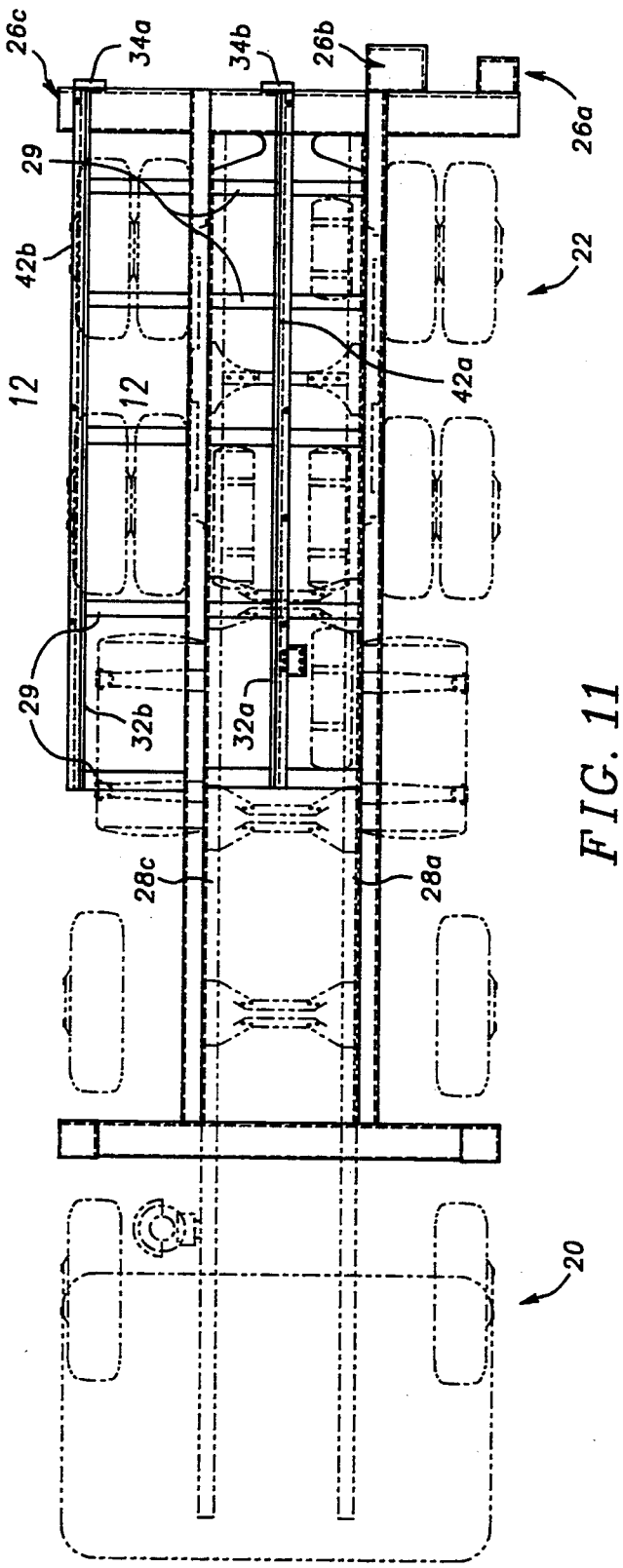

though this invention is commercially successful it has one primary disadvantage. The apparatus exceeds the legal highway weight limits and therefore requires permitting for street travel.

STREET LEGAL, MOBILE, TRUCK MOUNTED TUBE BUNDLE PULLING APPARATUS

This is a continuation of application Ser. No. 07/739,466, filed on Aug. 2, 1991, now abandoned.

The present invention generally relates to a truck mounted tube bundle puller and more specifically relates to a bundle puller which is interchangeable from a rearward lifting position to a forward travelling position making the mobile bundle puller highway legal.

BACKGROUND OF INVENTION

U.S. Pat. No. 4,575,305 to Krajicek et al. relates to a truck mounted tube bundle pulling apparatus. In this invention the tube bundle pulling apparatus is attached to a telescoping column. The telescoping column is rotatably mounted to the rear of the bed. Although this invention is commercially successful it has one primary disadvantage. The apparatus exceeds the legal highway weight limits and therefore requires permitting for street travel.

The highway legal limits are 34,000 lbs. on the dual drive axles, and 12,000 lbs. per steering axle. The invention disclosed in the '305 patent resulted in a weight of approximately 42,000 lbs. on the rear axles and 10,000 lbs. on the steer axle. This distribution could not be remedied due to the fixed location of the mass on the bed of the truck. For the past several years, Serv-Tech has spent many thousands of dollars in highway permits for transporting what has been classified as an overweight vehicle. Serv-Tech has also spent many thousands of dollars in unseen costs on equipment and manpower waiting for permits, waiting on weather conditions since many states will not permit movement during bad weather and storing and housing equipment and manpower since many states will not permit movement of overweight vehicles during nights, weekends and holidays.

Several unsuccessful attempts were made to resolve this problem. For example, an attempt was made to redistribute the weight by adding a third rear axle. This did not work and only exacerbated the steering problems.

At the time application for the '305 patent was made the weight distribution or highway legal problem was not recognized and therefore, at the time, there could not have been any motivation to solve the problem. Once the problem was recognized it took several unsuccessful attempts to resolve the problem before Applicant conceived of shifting the mass between two positions to resolve the problem.

SUMMARY OF THE INVENTION

The present invention resolves the highway legal problem by mounting the bearing and structures on a slide plate. By dragging the slide plate the weight can be redistributed by moving the center of gravity forward of the rear axle centers. Dual front steer axles are also added allowing 12,000 lbs. to be placed on each front axle. As a result of moving these structures forward, the truck becomes highway weight legal in all states and in most of Europe. Thus the requirement for obtaining moving permits is removed. The unit can be driven to and from job sites at any time as a conventional truck.

The invention relates to a street legal, mobile, truck mounted bundle pulling apparatus which is interchangeable from a lifting position to a travelling position. A longitudinal track is attached to the bed of the vehicle. A sled which is contiguous with said track supports a turntable. A vertical telescoping column is mounted on the turntable. A bundle pulling apparatus is attached to the vertical telescoping column. Hydraulic cylinders are used for actuating both the turntable and the sled. By actuating the sled the telescoping column and bundle pulling apparatus which is a majority of the mass can be drug between rearward lifting position and a forward travelling position.

BRIEF DESCRIPTION OF THE DRAWINGS

FIG. 4A is a front view of the invention shown in FIG. 3.

FIG. 5 is a back view of the invention shown in FIG. 3 showing the loading arm mounted thereon.

FIG. 9 is a top view of the sled.

FIG. 10 is a rear side view of the sled.

FIG. 11 is a plan view of the framing assembly.

FIG. 12 is a crossectional view taken along a line 12—12 of FIG. 11.

DETAILED DESCRIPTION OF THE INVENTION

By way of definition, it is to be understood that references to hydraulic cylinders encompass the pistons included therein including all necessary controls and connecting lines required to make such cylinders operational. The hydraulic cylinders and the controls as used in this invention are of a type well known in the art. U.S. Pat. No. 4,575,305 is incorporated by reference for information relating to the truck mounted tube bundle pulling art.

Figure 1:
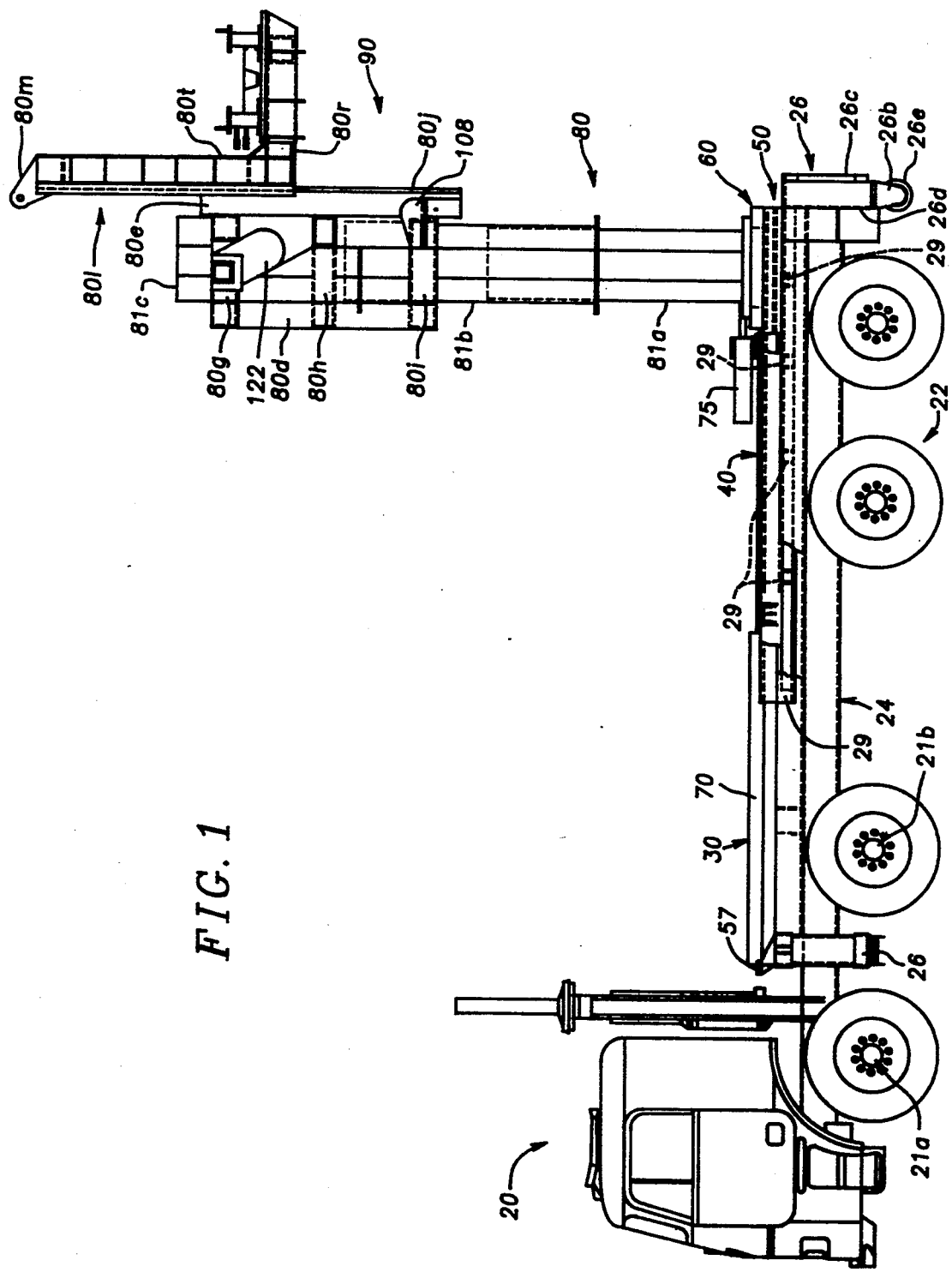
FIG. 1 is a side view of the invention shown in the lifting position.
Figure 2:
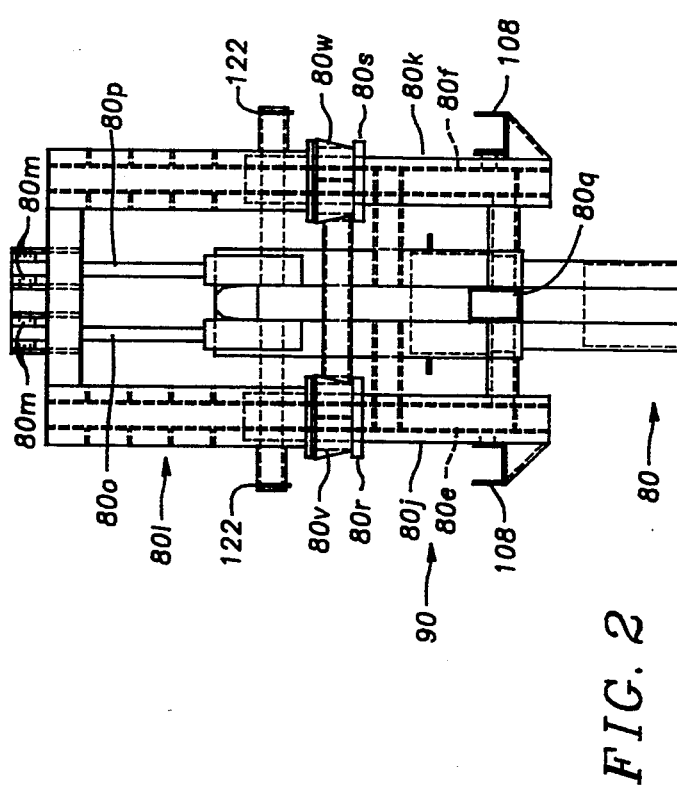
FIG. 2 is a back view of the invention (without the carriage frame) shown in FIG. 1.

Referring to FIGS. 1 and 2, the highway legal bundle pulling apparatus 10 generally includes a vehicle or truck 20 having a bed 30. A track 40 is attached to the bed 30. A sled 50 is mounted contiguous with said track 40 and a turntable 60 is mounted on the sled 50. Hydraulic cylinders 70 and 75 are used to actuate, respectively, sled 50 and turntable 60. A telescoping column 80 is mounted on turntable 60. A bundle pulling apparatus 90 is attached to the upper end of telescoping column 80.

Truck 20 preferably includes two front steering axles 21a and 21b although three front steering axles could be used as well. The design of dual and triple front steering axles 21 is of a type well known in the art. A bogie 22 is attached to the rear of the vehicle 20. The design of a bogie 22 is also well known in the art. The front axles and bogie are attached to truck frame 24 which supports outrigger assembly 26 (best seen in FIGS. 3–5). Four longitudinally running beams 28a, 28b, 28c, and 28d are welded to the outrigger assembly 26. The rear portion of outrigger assembly 26 (FIGS. 5 and 11) supports jacks 26a and 26c and rear stabilizer leg 26b.

Track 40 is welded to beams 28b and 28d. The track 40 is preferably made from two inverted L-shaped rails 42a and 42b. These rails 42 are fixed, preferably by welding, to beams 28b and 28d. The rails project inwardly for retaining or interposing the sled 50. Impact plates 34a and 34b are attached to outrigger assembly 26 and to rails 42a and 42b. Cross support members 29 support beams 28 (FIGS. 1 and 11).

Figure 6:
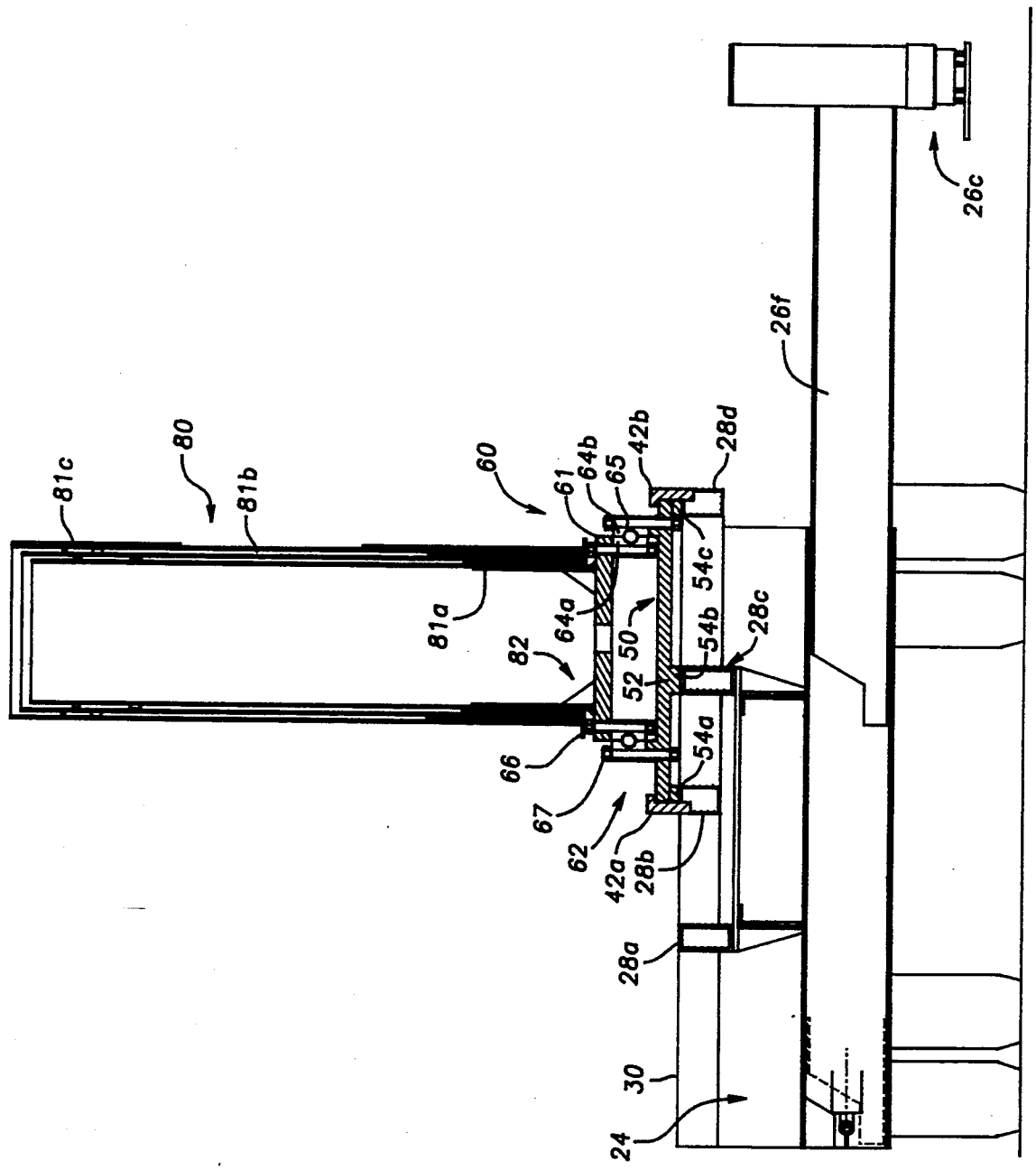
FIG. 6 is another rearward view of the invention showing the sled, rails, turntable and telescoping column in crossection.
Figure 7:
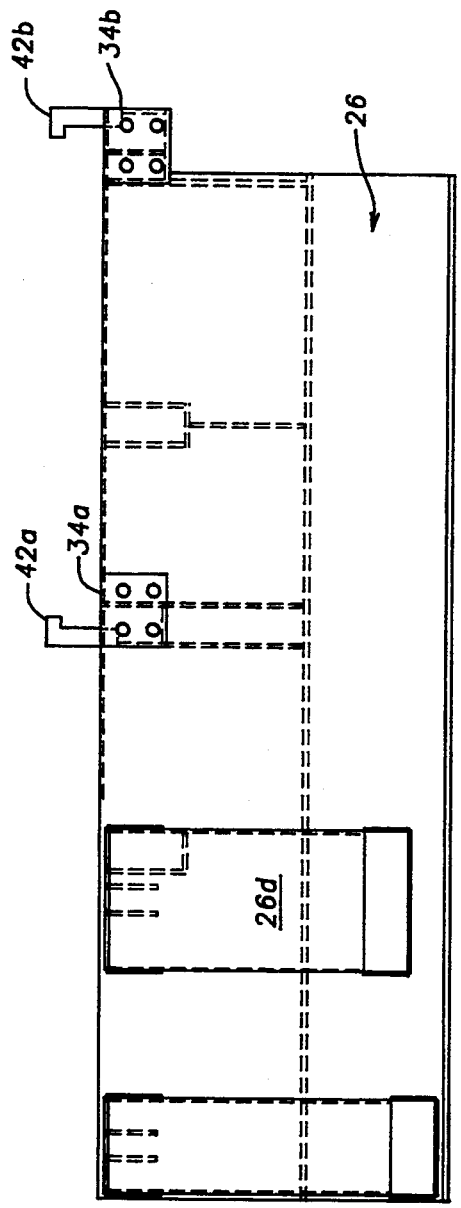
FIG. 7 is a rear view of the bed and outrigger assembly.
Figure 8:
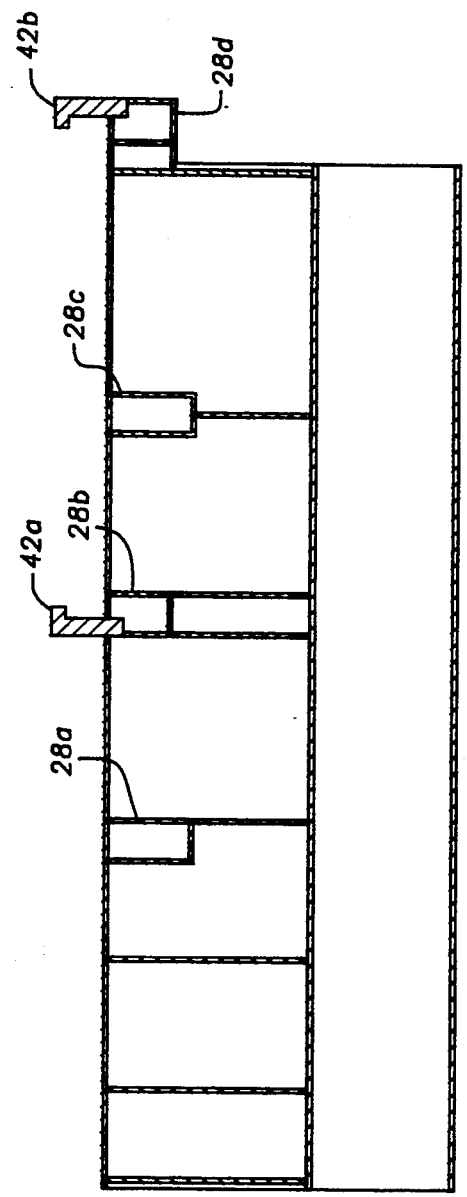
FIG. 8 is a crossectional view of the bed taken along line 8—8 of FIG. 3.

Sled 50 is contiguous with track 40 and in the particular embodiment shown is interposed between inverted L-shaped rails 42a and 42b. Referring to FIGS. 6, 9 and 10 sled 50 includes bearing plate 52 and three longitudinal runners 54a, 54b and 54c which are fixed, preferably by welding, to bearing plate 52. A lubricant can be placed between runners 54 and bed 30. Left and right locking pin attachments 56a and 56b are attached to bearing plate 52 and are used for locking the sled 50 in either the lifting position or the travelling position. A crane bearing mounting plate 58 is attached to bearing plate 52 for mounting of crane bearing 62. Rotate cylinder mount bracket 59 is also attached to bearing plate 52 for the mounting of hydraulic cylinder 75. Hydraulic cylinder 75 travels with sled 50. Nest 76 (FIG. 4) attached by tube 78 to mount bracket 59 also travels with sled 50 and nests hydraulic lines (not shown). It is to be understood that the hydraulic cylinders described herein could be replaced by other known actuation means such as a chain, a rack and pinion, a cable, etc.

Turntable 60 is mounted on bearing plate 52. The mounting is accomplished through a crane bearing 62. Crane bearing 62 includes inner race 64a, outer race 64b and ball bearings (depicted by 65). Turntable plate 61 is fixed to inner race 64a by bolts 66 (shown in FIG. 6). Outer race 64b is fixed to crane bearing mounting plate 58 and bearing plate 52 by bolts 67. Inner race 64a is rotatable with respect to outer race 64b yet is trapped by outer race 64a and the ball bearings. A clearance exists between bolts 66 and bearing plate 52 and between bolts 67 and outrigger assembly 26 or bed 30.

Telescoping column 80 is mounted on top of turntable 60. Telescoping column 80 preferably includes base section 81a, intermediate section 81b and upper section 81c. Base section 81a is fixed to turntable 60, preferably by welding with gussets 82 between turntable plate 61 and base section 81a.

The operation of the invention can be described as follows: After work has been completed at the worksite, hydraulic cylinder 70 is actuated to drag sled 50 forward to a forward travelling position. Once in the travelling position, pins (not shown) are used to lock the sled 50 in place. The vehicle 20 is now highway legal. Once the vehicle 20 arrives at a new worksite and is positioned for operation, hydraulic cylinder 70 can be actuated to drag (by pushing) the sled 50 to the rearward lifting position. Once in the lifting position, the sled 50 is pinned in place.

Figures 3, 4:
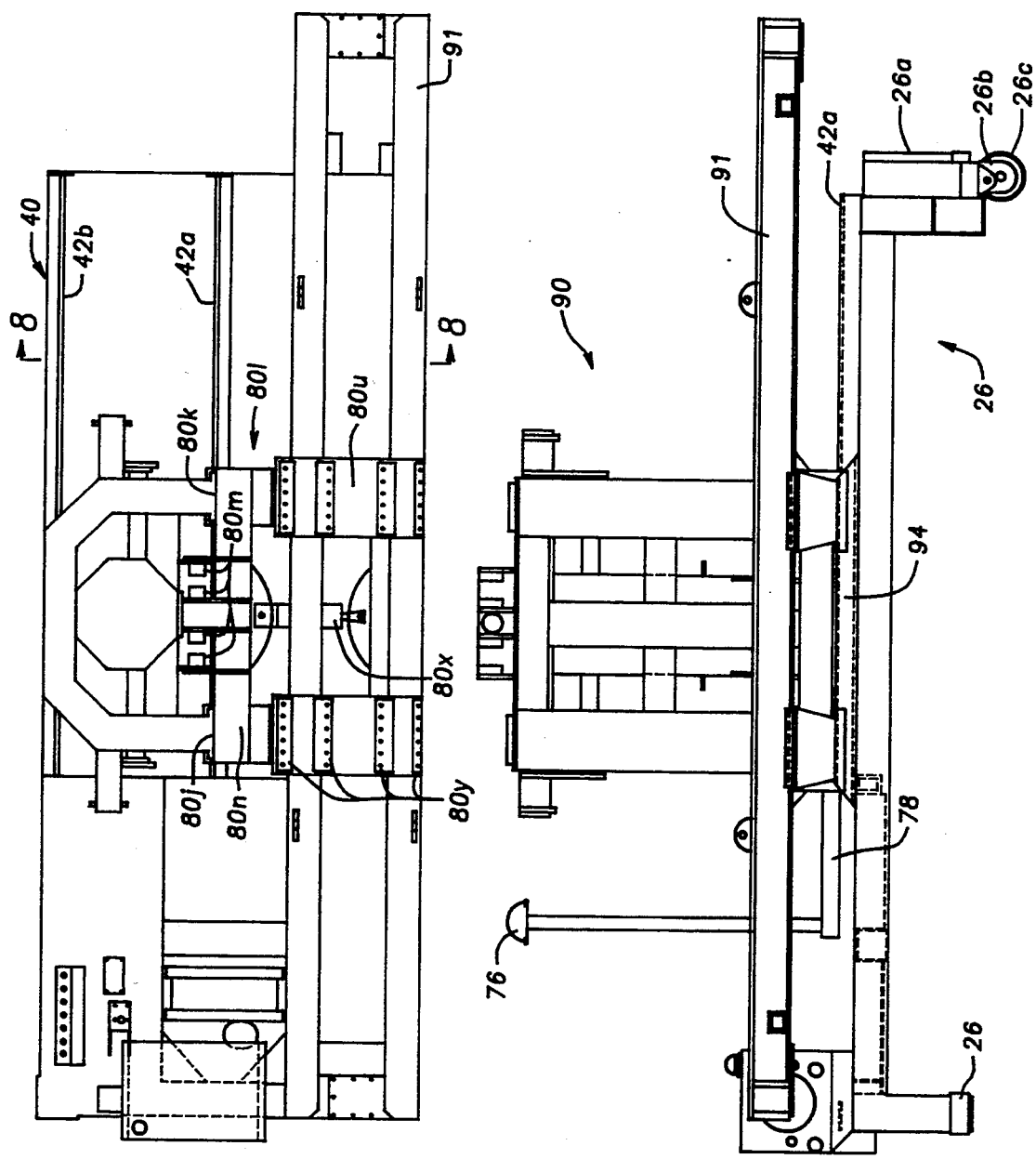
FIG. 3 is a plan view of the invention (without the truck) shown in the travel position.
FIG. 4 is a side view of the invention shown in FIG. 3.

Referring to FIG. 1, the overall length from the front end of the truck 20 to the end of the outrigger assembly 26 is preferably thirty feet (30'). The distance from the front end of the truck to the center of the front axle 21a is 62 inches and 63.6 inches separate the steering axles 21a and 21b. The rear steering axle is 108 inches from the front axle of the bogie 22. The axles of bogie 22 are separated by 56 inches with the center line of the bogie being half the distance between the axles of the bogie. The center of gravity of the rearward lifting position is located 45 inches from the center line of the rear bogie. The sled travels approximately 7 ½ feet from the rearward lifting position until it reaches the forward travel position (FIGS. 3 and 4). This results in a weight distribution as follows: 33,000 pounds bears upon the center line of the rear bogie, and 12,000 pounds bears upon each of the steering axles, resulting in an overall bearing weight of 57,000 pounds.

Figure 13:
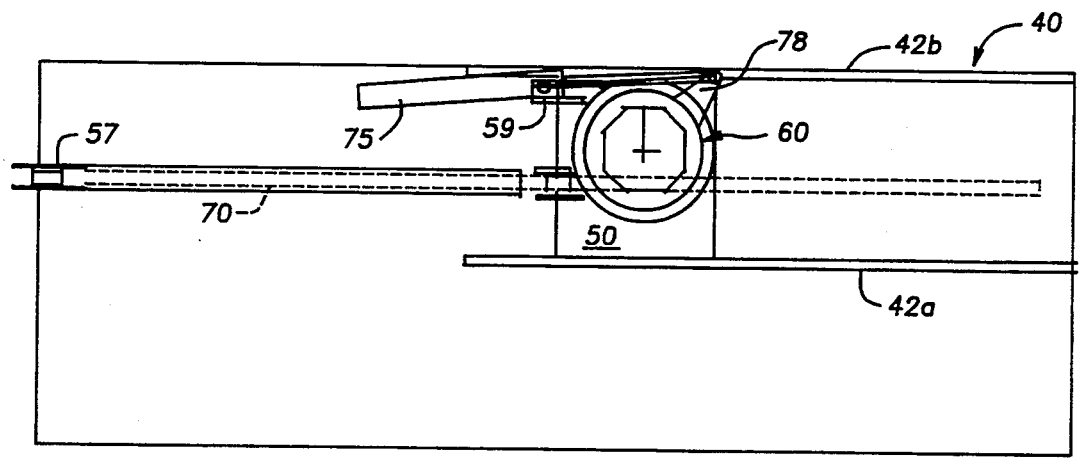
FIG. 13 is a plan view of the main features of the invention.

Referring to FIG. 13 hydraulic cylinder 70 is attached at one end to sled 50 and is attached at the other end to a clevis mount 57. Hydraulic cylinder 70 is preferably centered on the passenger side of truck 20 and attaches to sled 50 along a line through the center of gravity of sled 50.

Referring back to FIGS. 1–5, vertical telescoping column 80 has base section 81a mounted on top of turntable 60. Intermediate telescoping section 81b telescopes over base section 81a. It is understood that the preferred embodiment shows one intermediate telescoping section however, a design employing a plurality of intermediate telescoping sections is within the spirit of the invention. Top telescoping section 81c is adapted to telescope over the outside of intermediate telescoping section 81b. It is understood that the top telescoping section 81c and the intermediate telescoping section 81b are telescoped relative to base section 81a via a raising mechanism (not shown) located within vertical telescoping column 80 which is of a type well known in the art. Top telescoping section 81c has a frame 80d with structural members 80e and 80f connected thereto. Structural members 80e and 80f have a vertical, longitudinal axis which is parallel to the axis of vertical telescoping column 80. Structural members 80e and 80f are connected to arms 80g, 80h and 80i which are connected to top telescoping section 81c. Structural member 80e includes flange 80j (FIG. 3). Structural member 80f includes flange 80k. Flange 80k is parallel to flange 80j.

Figure 14:
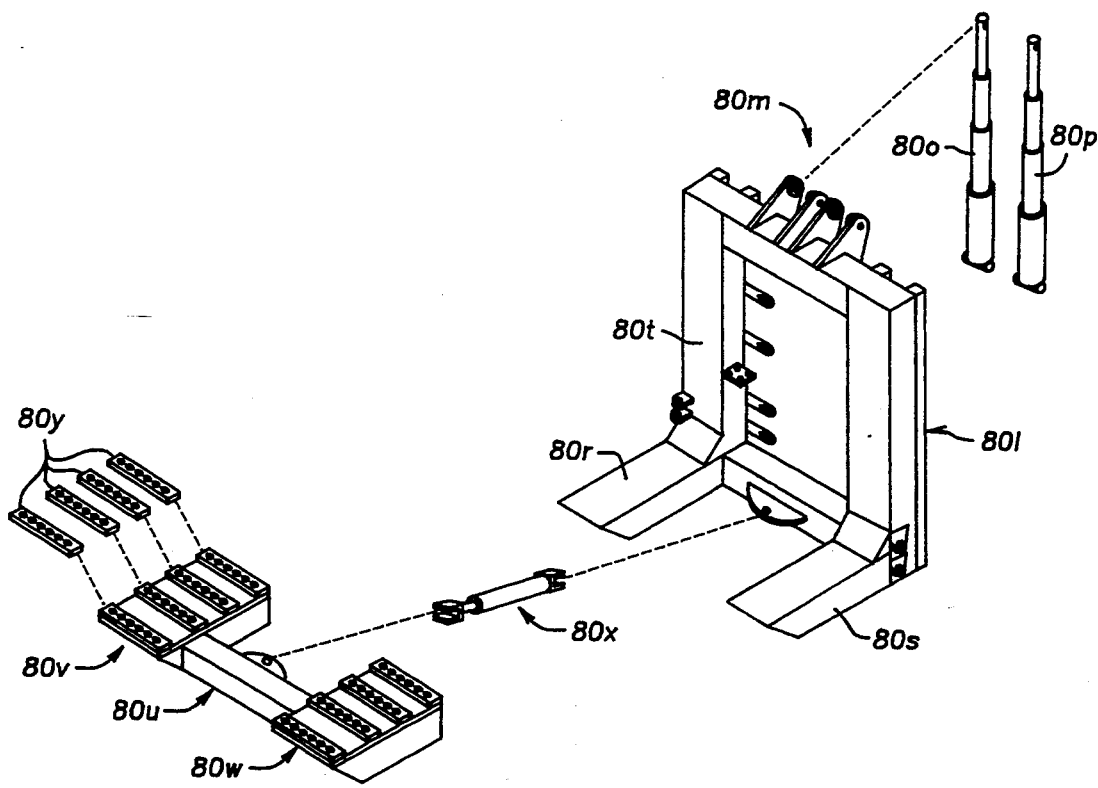
FIG. 14 is an exploded view of the fork shift assembly.

Bundle support member vertical adjustment section 80l (FIG. 1) is disposed to move vertically over guide flanges 80j and 80k. Bundle support member vertical adjustment section 80l contains four mounting lugs 80m attached to its upper end 80n (shown in FIG. 3), and disposed to accept support member telescoping shafts 80o and 80p (shown in FIGS. 2 and 14). Support member telescoping shafts 80o and 80p are each connected to mounting plate 80q. Therefore, on actuation of support member telescoping shafts 80o and 80p bundle support member vertical adjustment section 80l can be moved vertically independent of the telescoping action of top telescoping section 81c and intermediate telescoping section 81b over base section 81a. It is understood that although the preferred embodiment is disclosed as including a pair of telescoping shafts 80o and 80p for vertical movement of bundle support member vertical adjustment section 80l relative to top telescoping section 81c, other devices well known in the art such as hydraulic cylinders or rack and pinions may also be used without departing from the spirit of the invention.

Cradle forks 80r and 80s are connected to front wall 80t and extend horizontally therefrom. Cradle fork shift housing 80u defines grooves 80v and 80w for sliding over cradle forks 80r and 80s as actuated by cradle fork shift housing cylinder 80x. Retainer plates 80y define guide grooves which guide the horizontal movement of bundle support member 91 along the top of cradle fork shift housing 80u. The structure and operation of bundle support member 91 is incorporated herein as discussed in U.S. Pat. No. 4,575,305 at columns 6 to 9. Cradle fork shift housing 80u is extendable and retractable for fine tune adjustments required for alignment with heat exchangers, bundle dollies, etc. after truck 20 has been parked.

Since vertical telescoping column 80 is mounted on turntable 60 which is in turn moveable to the rear of bed 30, it is clear that when the longitudinal axis of bundle support member 91 is oriented at ninety degrees to the longitudinal horizontal axis of bed 30, bundle support member 91 may be lowered below the elevation of the bed 30. In order to lower bundle support member 91 below the elevation of bed 30 vertical telescoping column 80 must be in a fully contracted position wherein top telescoping section 81c and intermediate telescoping section 81b are fully lowered over base section 81a. Furthermore, support member telescoping shafts 80o and 80p must also be in their fully retracted position thereby lowering bundle support member vertical adjustment section 801 relative to top telescoping section 81c. As best understood by reference to FIG. 1, bundle support member vertical adjustment section 801 is disposed to move downwardly behind bed 30 and adjacent to mounting housing 26d which houses rear stabilizer leg 26b with wheel 26e. Bundle support member vertical adjustment section 801 may thus move downwardly to a level of eighteen inches above the ground.

After withdrawing a tube bundle from an exchanger shell, the tube bundle is raised or lowered, as needed, through the action of support member telescoping shafts 80o and 80p which can raise or lower bundle support member 91. Turntable hydraulic cylinder 75 is then used to align the longitudinal axis of bundle support member 91 with the longitudinal axis of the bed 30. Vertical telescoping column 80 is placed in a fully retracted position by telescoping intermediate telescoping section 81b and top telescoping section 81c downwardly toward base section 81a. At that point, the bundle support member 91 can be lowered until cradle forks 80r and 80s come in contact with carriage frame fork structure support 94 (FIG. 4). It is understood that the previously described lowering functions and maneuvering functions can occur in any order the operator so chooses by using a remote control (not shown) or the control console (not shown). It is also understood that depending upon the position of a bundle dolly (not shown) relative to truck bed 30 that the offloading assembly 100 may be used to load or unload a tube bundle from the bundle support member 91 when the bundle support member 91 is positioned transversely to the longitudinal axis of the over the road truck 20 and disposed below the elevation of bed 30.

Figure 15:
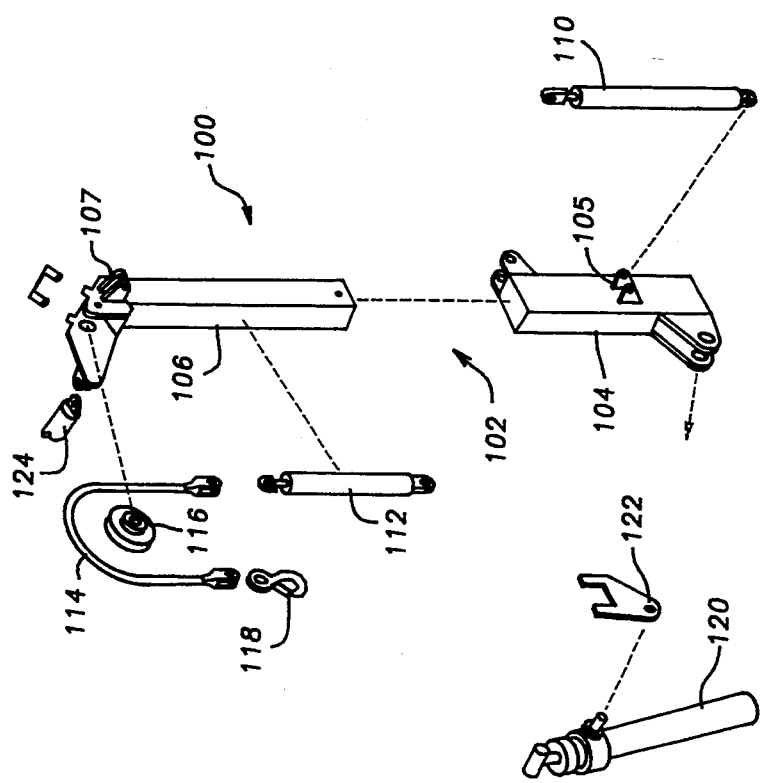
FIG. 15 is an exploded view of the telescoping loading arm.

Having fully lowered the bundle support member 91 with a tube bundle supported therefrom, off-loading mechanism 100 of this invention is used to transfer a tube bundle from bundle support member 91 to a bundle dolly. Referring to FIGS. 5 and 15, the off-loading mechanism 100 contains a first telescoping loading arm 102 and an opposite second telescoping loading arm (not shown). First telescoping loading arm 102 is identical in function to the second telescoping loading arm. Therefore, the foregoing discussion, while directed at first telescoping loading arm 102, is intended to apply to the second telescoping loading arm as well.

First telescoping arm 102 contains a base 104 and an upper section 106. Upper section 106 telescopes from within base 104. Base 104 is pivotally connected to mounting bracket 108 (see FIGS. 1 and 2).

First telescoping arm 102 can be raised by using loading arm scope cylinder 110. Arm scope cylinder 110 is connected to base 104 at brackets 105 and to upper section 106 at brackets 107. Therefore, actuation of arm scope cylinder 110 raises upper section 106 relative to base 104.

Cable actuating cylinder 112 is mounted at a lower end on upper section 106 and at an upper end is attached to cable 114 which is supported by pulley 116. Cable actuating cylinder 112 travels with upper section 106 within base 104. Actuation of cylinder 112 extends or retracts cable 114. Hook 118 is attached to the other end of cable 114 and is normally used for retaining a sling (FIG. 15 only) for movement of tube bundles.

The first telescoping loading arm 102 is pivoted about mounting bracket 108 via a loading arm tilt cylinder 120. The loading arm tilt cylinder 120 is pivotally mounted between mounting bracket 122 mounted on arm 80g and bracket 109 on base 104. Actuation of loading arm tilt cylinder 120 pivots first telescoping loading arm 102 for setting the tube bundle onto the bundle dolly. It should be noted that arm scope cylinder 110, cable actuating cylinder 112 and loading arm tilt cylinder 120 can be operated in any order chosen by the operator either simultaneously or serially by manipulation of remote controls (not shown) or by using a control console (not shown). As can be readily appreciated by one skilled in the art, first telescoping mast loading arm 102 is adapted to raise the tube bundle vertically using loading arm scope cylinder 110. The tube bundle can be further raised vertically using cable actuating cylinder 112 to retract cable 114.

As stated hereinabove, off-loading assembly 100 contains a first telescoping loading arm 102 and a second telescoping loading arm. A spreader bar 124 (FIG. 15) attaches to upper section 106 of first telescoping arm 102, as well as to upper section of the second telescoping arm. Therefore, spreader bar 124 serves a stabilizing function for off-loading assembly 100.

The bundle pulling apparatus 90 of the present invention is placed into service by driving the over-the-road truck 20 to a suitable location adjacent the heat exchanger whose bundle is to be removed or inserted. Lateral outrigger beam 26f and jack 26c as well as stabilizer leg 26b are actuated to shift the weight of the apparatus off of the wheels of truck 20. Actuation of hydraulic cylinder 70 drags (pushes) sled 50 to the lifting position. Hydraulic cylinder 75 via arm 78 rotates turntable 60 to a desired position. Turntable 60 is rotatable through approximately 105 degrees. Vertical telescoping column 80 is extended and rotated until the longitudinal axis of bundle support member 91 is aligned with the longitudinal axis of the heat exchanger. Refer to U.S. Pat. No. 4,575,305, column 11, lines 30-60 for a description of tube bundle removing procedures. Having fully withdrawn the tube bundle from the heat exchanger shell, vertical telescoping column 80 is rotated and retracted thereby aligning the longitudinal axis of the bundle support member 91 with the longitudinal axis of the bed 30 and allowing the bundle support member 91 to be lowered toward bed 30 while dragging sled 50 toward the travel position until forks 80r and 80s come in contact with support 94. Vertical telescoping column 80 can also be rotated to position the longitudinal axis of bundle support member 91 transversely to the longitudinal axis of bed 30. Support member telescoping shafts 80o and 80p can be used to lower bundle support member 91 behind the bed 30 of truck 20 and to an elevation below the bed 30. From either position described above, the offloading mechanism 100 may be used to transfer the tube bundle from bundle support member 91 to a waiting bundle dolly. It should be noted that the bundle pulling apparatus 90 is suitable for removing tube bundles from heat exchangers having a ground clearance of as little as eighteen inches. In situations where tube bundles are inaccessible from the position shown in FIGS. 1 and 2, truck 20 can be backed in and the bundle extracted with bundle pulling support member 91 parallel to the longitudinal axis of bed 30. Other configurations are possible.

The preferred embodiment of the invention is shown and described. The disclosure and description of the invention are illustrative and explanatory thereof, and various changes in the size, shape, and materials, as well as in the details of the illustrated construction may be made without departing from the spirit of the invention.

What is claimed is:

1. A street legal, mobile tube bundle pulling apparatus mounted on a truck and movable from a lifting position to a traveling position, said truck having a bed disposed along a longitudinal axis and having a forward end and a rearward end, said bed being supported by at least two pairs of steerable wheels arranged in tandem relationship with one of said pairs of steerable wheels being disposed adjacent said forward end and the other pair being spaced rearwardly from said one pair, and by a plurality of nonsteerable wheels mounted on at least two axles arranged in tandem relationship with one of said axles being disposed adjacent said rearward end of the bed and the other one of said axles being spaced forwardly of the one axle, said apparatus comprising:

a track attached to said bed and running in a longitudinal direction with respect to said bed;
an outrigger assembly extendably mounted on said bed;
a sled slidably mounted on said track at a position elevationally above said bed;
a turntable mounted on said sled;
a vertical telescoping columnmounted on said turntable;
a bundle pulling apparatus attached to said column;
a hydraulic means for rotating said turntable; and
a hydraulic means for dragging said sled on said track between said lifting position and said traveling position at which the weight of said sled, said turntable, said vertical telescoping column and said tube bundle pulling apparatus is adjustably positioned with respect to said longitudinal axis to controllably distribute said weight between said steerable wheels and said nonsteerable wheels.

2. The apparatus according to claim 1 wherein said steerable wheels have a centerpoint longitudinally equidistantly positioned between said steerable wheels that is separated from a longitudinal centerpoint of said axles by fourteen feet, and the traveling position is seven and one-half feet forward of the lifting position.

3. The apparatus according to claim 1 wherein said turntable comprises: a crane bearing fixed to said sled and to said column.

4. The apparatus according to claim 1 wherein said sled comprises a bearing plate attached to at least two runners.

5. The apparatus according to claim 1 wherein said track comprises two rails each having an inward projection, wherein said rails are fixed to said bed such that said inward projections retain said sled.

6. In a tube bundle pulling apparatus mounted on a truck, said truck having a bed disposed along a longitudinal axis and a forward end and a rearward end, said bed being supported at the forward end by at least two pairs of steerable wheels and at the rearward end by a plurality of non-steerable wheels mounted on at least two axles, and said apparatus having a vertical telescoping column mounted to a turntable, and a tube bundle pulling apparatus mounted to the column, wherein the improvement comprises:

mounting the turntable to a sled, said sled being carried by a track mounted longitudinally on the bed to enable the sled to travel between a forward traveling position at which the weight of said sled, said turntable, said vertical telescoping column and said tube bundle pulling apparatus is adjustably positioned with respect to said longitudinal axis to controllably distribute said weight between said steerable wheels and said nonsteerable wheels and a rearward lifting position adjacent the rearward end of said bed.

* * * * *